Aug. 4, 1953   O. E. TOLLEFSBOL   2,647,770
SEALED TELESCOPIC PIPE JOINT
Filed Oct. 4, 1950

INVENTOR.
Orion E. Tollefsbol
BY
Roland A. Anderson
ATTORNEY

Patented Aug. 4, 1953

2,647,770

UNITED STATES PATENT OFFICE 2,647,770

SEALED TELESCOPIC PIPE JOINT

Orion E. Tollefsbol, Oak Ridge, Tenn., assignor to the United States of America as represented by the United States Atomic Energy Commission Application October 4, 1950, Serial No. 188,437

3 Claims. (Cl. 285—163)

This invention relates to sealed telescopic pipe joints and metallic gaskets therefor, and it is particularly concerned with apparatus of this nature which is especially adapted to operate under extremely rigorous conditions of temperature and pressure.

The present invention has particular utility in connection with the common problem of providing a flexible fluid tight interconnection between two aligned pipes or ducts. One approach to the solution of this problem involves terminating one of the pipes in a section having a larger internal diameter than the outer diameter of the other pipe, telescoping the enlarged section about the smaller pipe, and inserting a hollow metallic ring gasket in the annular space formed between the two pipes.

The hollow metallic ring gaskets heretofore employed for this purpose have been fabricated of a deformable non-resilient metal, such as soft copper, and they have been symmetrical with respect to a transverse plane. Such gaskets have not proved entirely satisfactory for use under extremely high temperature conditions involving substantial differential expansion between the ring gasket and the joined pipes. It will be apparent that under such conditions undesirable hoop stresses are set up in the gasket by the expansion and contraction of the surrounding pipes. Furthermore, in order for the gasket to accommodate itself to the varying pipe diameter, the actual cross section of the hollow tubing from which the gasket is formed must also vary, and this, in turn, varies the packing pressure and may cause the gasket to leak. In other words, under stringent conditions, the tubing may have to elongate itself to such an extent that its diameter may actually become less than the space between the telescoped pipes, under which conditions of course, it is no longer effective as a gasket.

Accordingly, an object of the present invention is to provide a flexible sealed joint adapted to remain fluid tight under extremely high operating temperatures.

Another object of the present invention is to provide a hollow metallic ring gasket adapted to accommodate itself to varying diameters without the simultaneous introduction of hoop stress and without simultaneous variation in diameter of the gasket tubing.

Applicant has conceived that the above objects may be accomplished by fabricating the hollow ring gasket of a resilient metal, rather than a non-resilient metal, and by forming the ring gasket so as to be non-symmetrical with respect to a median transverse plane. Thus, in accordance with the principles of the present invention, applicant forms his gasket such that it oscillates axially of the pipes as it travels around the circumference of the inner pipe. In this manner, forced variations in the diameter of the gasket, resulting from expansion and contraction of the associated pipes, are taken up by variations in the magnitude of the axial oscillations, and thus no undesirable hoop stresses or variations in the diameter of the tubing result.

Other objects and advantages of the present invention will become apparent from the following detailed description when taken in connection with the accompanying drawings, wherein Fig. 1 is an elevation view, partially broken away, of one embodiment of a sealed joint constructed according to the principles of the present invention.

Figure 1:
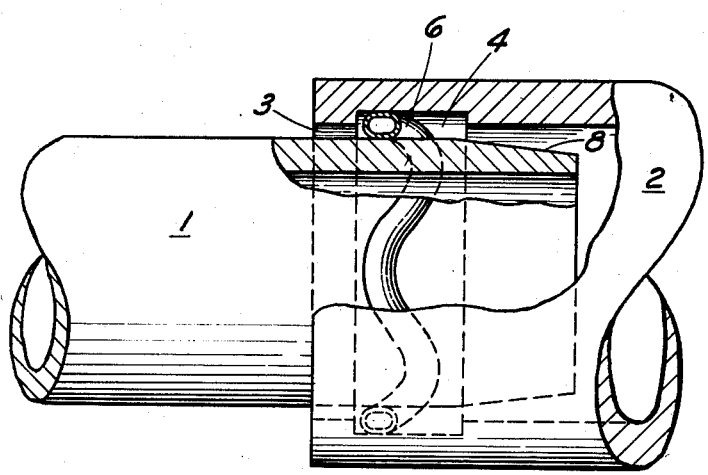

Referring now to the drawings, the two pipes which are to be joined in a fluid tight flexible relationship are designated at 1 and 2, respectively, the inner diameter of at least the end section of pipe 2 being larger than the outer diameter of pipe 1. The outer surface of the extremity of pipe 1 is tapered somewhat, as indicated at 8. The two pipes are arranged in telescoped relationship, that is, the end of pipe 1 is inserted within pipe 2 thereby forming an annular space 3 between the pipes. An annular groove or recess 4 is cut in the inner surface of pipe 2 near the end of the pipe.

Figure 3:
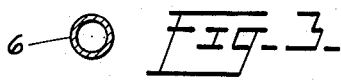
Fig. 3 is a cross section of the tubing from which the gasket of Fig. 2 is fabricated.
Figure 4:
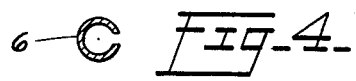
Fig. 4 is a cross section of a modified form of tubing which may be used to fabricate the gasket of Fig. 2.

Within the recess 4 is disposed the sealing gasket 6 which is formed of a continuous length of hollow tubing fabricated of a resilient metallic material, such as a spring steel or Monel metal. The hollow tubing, when uncompressed, may have either an O-shaped cross section, as shown in Fig. 3, or a C-shaped cross section, as shown in Fig. 4, the latter being preferred. The gasket 6 is circular, when viewed axially of the pipes, so as to conform to the circular cross section of the pipes. However, in its traverse around the circumference of pipe 1, the tubing zig-zags axially of the pipe. Thus, when viewed perpendicularly to the axis of the pipes, the gasket presents a generally sinusoidal or serpentine contour resulting from the axial excursions of the tubing from a median transverse plane.

Figure 2:
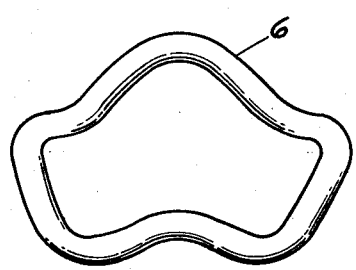
Fig. 2 is a perspective view of the novel gasket employed in the sealed joint of Fig. 1.

Since the tubing is fabricated of a resilient metal, it will be apparent that the gasket, itself, will have some normal (undeflected) diameter, and that its diameter may be made to vary in either direction from its normal value by spring action, the variation in effective circumference being accommodated by an inverse variation in the amplitude of the axial excursions about its median transverse plane. Thus, if the normal (undeflected) contour of the gasket is as shown in Fig. 2, it will be clear that the gasket may be sprung apart so as to increase its diameter and decrease the amplitude of the axial excursions, or the gasket may be compressed so as to decrease its diameter and increase the amplitude of the axial excursions. It will also be appreciated that such variations in diameter of the gasket will not result in any change in the cross section of the tubing nor in the introduction of undesirable hoop stresses in the tubing.

In assembling the sealed joint shown in Fig. 1, the gasket is first compressed and inserted in the end of pipe 2 and is then permitted to spring into the recess 4, the gasket being initially fabricated to have a normal (undeflected) outer diameter somewhat greater than the diameter of the recess 4 so that the gasket will be securely retained in the recess by its own spring action. The end of pipe 1 is inserted into the end of pipe 2, and pipe 1 is then forced into the position shown in Fig. 1, the taper 8 at the end of pipe 1 gradually compressing the gasket tubing into a somewhat oval cross section, as shown in Fig. 1.

It will be apparent that by virtue of the above-described spring action of the gasket 6, the flexible sealed joint of the present invention will remain gas tight irrespective of any differential expansion which may occur between the gasket and the associated elements of the joint, the gasket being capable of adjusting itself to any changes in diameter which the pipes may experience. Since this adjustment occurs without change in the cross section of the gasket tubing, the packing pressure of the tubing is not altered nor are any hoop stress introduced in the tubing. The sealed joint of the present invention is thus of particular utility in applications involving the sealing of high pressure fluids at high temperatures. It will also be appreciated that the sealed joint of the present invention is adapted to accommodate linear, rotary, and some angular displacement between the pipes 1 and 2.

It should be understood that the invention is not limited to use in association with round pipes. The gasket 6 could be fabricated to have any desired shape when viewed along the pipes, for example, a hexagonal shape if it is to be used in association with hexagonal pipes.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. A sealed joint of the character described, comprising, in combination, a first tube, a second tube of larger diameter telescoped about said first tube to form an annular space therebetween, and a continuous, ring-like, hollow, resilient, metallic gasket disposed in its entirety in the annular space between said tubes to form a seal therebetween, the normal uncompressed diameter of said gasket being greater than the distance between the outer surface of said first tube and the inner surface of said second tube so that said gasket is compressed when so disposed in said annular space, said gasket having a serpentine contour formed by axial excursions about its median transverse plane, said gasket being unrestrained in respect to expansion and contraction in an axial direction.

2. Apparatus, as claimed in claim 1, wherein said gasket is formed of hollow tubing having an O-shaped cross section.

3. Apparatus, as claimed in claim 1, wherein said gasket has a C-shaped cross section.

ORION E. TOLLEFSBOL.

References Cited in the file of this patent
UNITED STATES PATENTS

| Number | Name | Date |
|---|---|---|
| Re. 16,978 | Joyce | May 29, 1928 |
| 1,349,060 | Gall et al. | Aug. 10, 1920 |
| 1,505,552 | Garner et al. | Aug. 19, 1924 |
| 1,875,148 | Reid | Aug. 30, 1932 |
| 1,921,555 | Welsh | Aug. 8, 1933 |
| 1,924,020 | Bihet | Aug. 22, 1933 |
| 1,927,825 | Elkin | Sept. 26, 1933 |
| 2,369,008 | Beecher | Feb. 6, 1945 |

FOREIGN PATENTS

| Number | Country | Date |
|---|---|---|
| 474,238 | Great Britain | of 1937 |
| 566,125 | Great Britain | Dec. 14, 1944 |